United States Patent
Beach et al.

(10) Patent No.: US 7,041,809 B2
(45) Date of Patent: May 9, 2006

(54) METAL COMPLEX DYES FOR INKJET INKS

(75) Inventors: Bradley Leonard Beach, Lexington, KY (US); James F. Feeman, Wyomissing, PA (US); Kelly Ann Killeen, Lexington, KY (US)

(73) Assignee: Lexmark International, Inc., Lexington, KY (US)

(*) Notice: Subject to any disclaimer, the term of this patent is extended or adjusted under 35 U.S.C. 154(b) by 48 days.

(21) Appl. No.: 10/877,163

(22) Filed: Jun. 25, 2004

(65) Prior Publication Data

US 2005/0288493 A1 Dec. 29, 2005

(51) Int. Cl.
*C09B 29/36* (2006.01)
*C09B 29/44* (2006.01)
*C09B 29/52* (2006.01)
*C07D 215/40* (2006.01)

(52) U.S. Cl. .................... 534/765; 546/171
(58) Field of Classification Search ........... 546/171; 534/765
See application file for complete search history.

(56) References Cited

U.S. PATENT DOCUMENTS

| | | | |
|---|---|---|---|
| 2,234,724 A | 3/1941 | Dickey | |
| 4,001,203 A | 1/1977 | Back et al. | |
| 4,077,953 A | 3/1978 | McCrae et al. | |
| 4,113,717 A | 9/1978 | Parton | |
| 4,420,550 A | 12/1983 | Evans et al. | |
| 5,997,622 A | 12/1999 | Weber et al. | |
| 6,001,161 A | 12/1999 | Evans et al. | |

FOREIGN PATENT DOCUMENTS

| | | | |
|---|---|---|---|
| JP | 2005146090 A2 | * | 6/2005 |
| JP | 2005179418 A2 | * | 7/2005 |
| WO | 2004087814 | * | 10/2004 |

OTHER PUBLICATIONS

Iida, H.; Ikegami, A. Kogyo Kagaku Zasshi, 1964, 67(1), 118-120 [CAS abstract attached].*

Lu, Wenan et al. "Synthesis of derivatives of 5-thiazolylazo-8-aminoquinoline and their color reaction with copper, cobalt, nickel and palladium," 1994, XP-002346446, Chemical Abstracts Service, Columbus, Ohio.

* cited by examiner

*Primary Examiner*—Kamal A. Saeed
*Assistant Examiner*—Jason M. Nolan
(74) *Attorney, Agent, or Firm*—John A. Brady

(57) ABSTRACT

A light-resistant, metal complex dye for inkjet printing comprising a substituted 8-heterocyclic azo-5-aminoquinoline of the following structural formula:

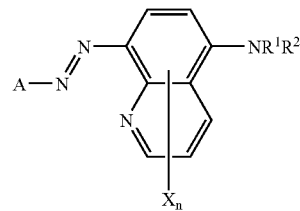

38 Claims, No Drawings

METAL COMPLEX DYES FOR INKJET INKS

TECHNICAL FIELD

This invention relates to new metal complex dyes, particularly useful for inkjet printing.

BACKGROUND OF THE INVENTION

Marketplace demands for inkjet printers capable of producing images of photographic quality and archivability require the development of novel colorants (dyes) of increased brightness and light-fastness. Many available dyes exhibiting bright hues suffer from poor light-fastness. Conversely, many available colorants that fade little with time are dull in color. It is the purpose of this disclosure to describe a novel series of 8-heterocyclic azo-5-aminoquinoline metal complex dyes, which demonstrate improved light-fastness while exhibiting bright, vivid colors.

Dyes disclosed in U.S. Pat. No. 6,001,161 to Weber et al.; U.S. Pat. No. 5,997,622 to Evans et al.; and U.S. Pat. No. 4,001,203 to Back et al. are similar in structure to the dyes of this invention. It has been found, however, that the incorporation of an amine group in place of hydroxyl on the quinoline moiety affords the opportunity for the facile addition of functionality offering improvements to properties such as solubility, solution stability, water-fastness, light-fastness, and ozone-fastness. Secondly, it is not chemically obvious or intuitive that dyes with amine groups will display similar colors or properties to related hydroxyl derivatives.

DISCLOSURE OF THE INVENTION

The present invention relates to metal-complex azo dyes formed from 8-heterocyclic azo-5-aminoquinoline dyes of the following formula:

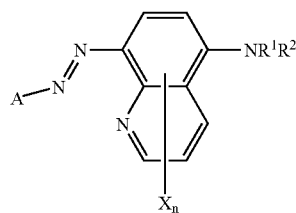

wherein:

A represents an aromatic mono or bi-heterocyclic radical containing at least one nitrogen atom which, along with the nitrogen atoms of the azo link and quinoline moieties, can participate in the coordination of transition-metal ions.

Each X independently represents an optionally substituted alkyl, optionally substituted aryl, optionally substituted alkoxide, optionally substituted amine, optionally substituted amide, optionally substituted ester, sulfo or salts thereof, sulfonamide, carboxy or salts thereof, phospho or salts thereof, halide, cyano, or nitro, among others.

n is an integer value 0–5.

$R^1$ and $R^2$ each independently represent hydrogen, optionally substituted alkyl, optionally substituted —C(O)alkyl, optionally substituted —C(O)aryl, optionally substituted —$SO_2$alkyl, or optionally substituted —$SO_2$aryl.

Azo compounds of foregoing formula I are reacted with transition-metal ions in a 1:1 or 2:1 (organic:metal) molar ratio to form the inventive dyes. Suitable transition-metal ions include, but are not limited to, Cr(III), Mn(II), Fe(II, III), Co(II,III), Ni(II), Cu(II), Zn(II), Pd(II), and Pt(II). More preferred metals are Ni(II) and Cu(II). Some non-limiting examples of dye structures are shown in Table 1.

TABLE 1

(Exemplary Dyes)

| Dye No. | A | n | $R^1$ | $R^2$ | Metal Complex (Organic: Metal ratio) |
|---|---|---|---|---|---|
| 1 | 4,5-dicyanoimidazol-2-yl (NC, NC-imidazole) | 0 | H | H | Ni(II) (2:1) |
| 2 | 4,5-dicyanoimidazol-2-yl (NC, NC-imidazole) | 0 | H | H | Cu(II) (2:1) |
| 3 | 4,5-dicyanoimidazol-2-yl (NC, NC-imidazole) | 0 | H | —$CH_2CH_2CO_2H$ | Ni(II) (2:1) |
| 4 | 4,5-dicyanoimidazol-2-yl (NC, NC-imidazole) | 0 | H | —$CH_2CH_2CO_2H$ | Cu(II) (2:1) |

TABLE 1-continued
(Exemplary Dyes)
| Dye No. | A | n | R¹ | R² | Metal Complex (Organic: Metal ratio) |
|---|---|---|---|---|---|
| 5 | 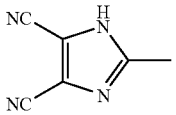 | 0 | H | —CH$_2$SO$_3$H | Ni(II) (2:1) |
| 6 | 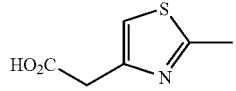 | 0 | H | H | Ni(II) (2:1) |
| 7 | 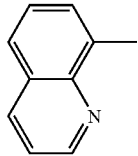 | 0 | H | —CH$_2$CH$_2$CO$_2$H | Ni(II) (2:1) |
| 8 | 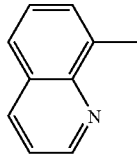 | 0 | H | —CH$_2$SO$_3$H | Ni(II) (2:1) |
| 9 | 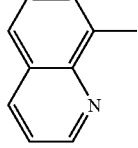 | 0 | H | —CH$_2$SO$_3$H | Cu(II) (2:1) |
| 10 | 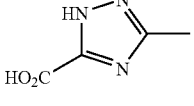 | 0 | H | H | Ni(II) (2:1) |
| 11 | 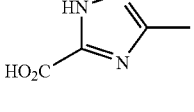 | 0 | H | H | Cu(II) (2:1) |
| 12 | 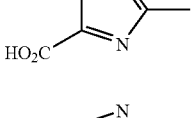 | 0 | H | —CH$_2$CH$_2$CO$_2$H | Ni(II) (2:1) |
| 13 | 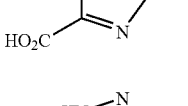 | 0 | H | —CH$_2$CH$_2$CO$_2$H | Cu(II) (2:1) |
| 14 | 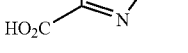 | 0 | H | —C(O)CH$_3$ | Ni(II) (2:1) |

The inventive dyes can be used as colorants in ink-jet inks. They can be used alone, or in combination with other colorants to provide optimal performance and color.

The A substituent in the foregoing Dyes 1–5 is 2-(4,5-dicyano-1,3-imidazolyl)-.

The A substituent in the foregoing Dye 6 is 2-(4-carboxymethyl-1,3-thiazolyl)-.

The A substituent in the foregoing Dyes 7–9 is 8-quinolinyl.

The A substituent in the foregoing Dyes 10–14 is 3-(5-carboxyl-1,2,4-triazolyl)-.

The $R^2$ substituent of the foregoing Dyes 3,4,7. and 12 is 2-carboxyethyl.

The $R^2$ substituent of the foregoing Dyes 5,8 and 9 is sulfomethyl.

EXAMPLES

Example 1

Synthesis of Dye 3

Acrylic acid (55g; 0.76 mol) was added to a solution of 5-aminoquinoline (100 g; 0.69 mol) in 400 ml 1-methyl-2-pyrrolidinone. The mixture was refluxed 3 hours, then cooled to 80° C. and poured into 1000 ml room-temperature water. The resulting orange precipitate was filtered and dried at 60° C. (Yield=101.77 g; 68%)

A solution of sodium nitrite (7.59 g; 0.11 mol) in 25 ml water was added dropwise to a slurry of 2-amino-4,5-dicyanoimidazole in 49 g concentrated HCl (37% aq.) and 100 ml water at 0–5° C. in ice bath. The mixture was stirred 1 hour at 0–5° C. and excess nitrite was removed with 10% aqueous sulfamic acid. The resultant diazonium was added dropwise over 30 minutes to a solution of N-(2-carboxyethyl)-5-aminoquinoline (21.62 g; 0.1 mol; prepared above) in 300 ml 20% aqueous sodium carbonate at 0° C. The mixture warmed slowly to room temperature as the ice bath melted. The resulting reddish precipitate was filtered and dried at 60° C. (crude yield=39 g).

The crude solids (33.3 g) were re-dissolved in 500 ml water. Addition of nickel(II) acetate tetrahydrate (8 g; 0.032 mol) immediately afforded a bright bluish-magenta solution of Dye 3 ($\lambda_{max}$=530/555 nm). The dye solution was further purified by ultra-filtration prior to evaluation.

Example 2

Synthesis of Dye 12

A solution of sodium nitrite (7.59 g; 0.11 mol) in 25 ml water was added rapidly dropwise to a slurry of 3-amino-1,2,4-triazole-5-carboxylic acid (12.81 g; 0.1 mol) in 49 g concentrated HCl (37% aq.) and 100 ml water at 0–5° C. The mixture was stirred 90 minutes at 0–5° C. The resultant diazonium slurry was added rapidly dropwise during 15 minutes to a solution of N-(2-carboxyethyl)-5-aminoquinoline (21.62 g; 0.1 mol; prepared above) in 300 ml 20% aqueous sodium carbonate at 0° C. and cooled in ice bath. The mixture was stirred 5 hours, slowly warming to room temperature as the ice bath melted. The pH of the slurry was adjusted to 6.0 with concentrated HCl (37% aq.). The resulting orange precipitate was filtered and then dried at 60° C. (crude yield=49.5 g).

The crude product (42.9 g) was re-dissolved in 2000 ml water. Addition of solid nickel(II) acetate tetrahydrate (7.75 g; 0.031 mol) immediately afforded a bright magenta solution of Dye 12 ($\lambda_{max}$=525 nm). The dye solution was further purified by ultra-filtration prior to evaluation.

Comparative Example

Dye C

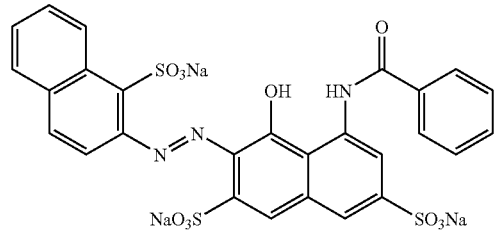

Inks and Evaluation

Inks were formulated for testing as outlined in Table 2, below

TABLE 2

(Exemplary Ink Formulations)

| Component | Ink 1 (wt. %) | Ink 2 (wt. %) | Ink 3 (wt. %) |
|---|---|---|---|
| Dye 3 | 1 | — | — |
| Dye 12 | — | 1 | — |
| Dye C | — | — | 3 |
| 2-Pyrolidone (humectant) | 15 | 15 | 15 |
| 1,2-Hexanediol (penetrant) | 3 | 3 | 3 |
| PROXELGXL (biocide) | 0.1 | 0.1 | 0.1 |
| SILWET L-7600 (surfactant) | 0.5 | 0.5 | 0.5 |
| Water | Balance | Balance | Balance |

The pH of each ink was adjusted, if necessary, to between 7.0 and 9.0 using 20% sodium hydroxide (aq.) or 20% acetic acid (aq.) and the inks were filtered through 0.22 μm membranes.

Images were printed on LEXMARK PREMIUM PHOTO (P1) and KODAK PREMIUM PICTURE MAKER (P2) papers using a LEXMARK Z65 Color Jetprinter. Colored blocks ranging from 5% to 100% dot coverage were printed. Each ink was evaluated for optical density (OD), chroma (c*), and hue (h*) at 100% dot coverage. Light-fastness was evaluated for color blocks corresponding to optical densities of 1, 0.6 and 0.3, by determining the percent loss in optical density (ΔOD) after fading in an Atlas UV2000 chamber for 7 days at 1.10 w/m², 30° C. and 60% relative humidity. Results are summarized in Table 3.

TABLE 3

(Color and Light-fastness data)

| Paper | Ink | OD | c* | h* | ΔOD (% loss) (1.0) | ΔOD (% loss) (0.6) | ΔOD (% loss) (0.3) |
|---|---|---|---|---|---|---|---|
| P1 | 1 | 1.62 | 80.2 | 330 | 20 | 21 | 25 |
|  | 2 | 1.45 | 70.8 | 351 | 23 | 25 | 28 |
|  | 3 | 1.87 | 75.0 | 350 | 55 | 60 | 65 |

TABLE 3-continued (Color and Light-fastness data)

| Paper | Ink | OD | c* | h* | ΔOD (% loss) (1.0) | ΔOD (% loss) (0.6) | ΔOD (% loss) (0.3) |
|---|---|---|---|---|---|---|---|
| P2 | 1 | 1.45 | 78.8 | 327 | 65 | 66 | 65 |
|    | 2 | 1.13 | 65.4 | 351 | 61 | 65 | 68 |
|    | 3 | 1.87 | 75.7 | 347 | 88 | 88 | 87 |

Inks prepared from the inventive dyes show improved light-fastness on both papers and maintain acceptable color strength.

What is claimed is:

1. Substituted 8-heterocylic azo-5-aminoquinoline dyes of the following formula reacted with transition-metal ions selected from the group consisting of Cr(III), Mn(II), Fe(II, III), Co(II,III), Ni(II), Cu(II), Zn(II), Pd(II) and Pt (II) in a 1:1 or 2:1 (organic:metal) by weight ratio:

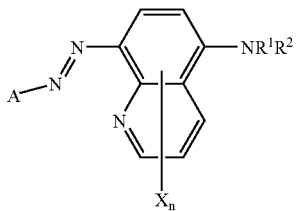

wherein:
A represents an aromatic bi-heterocyclic radical containing at least one nitrogen atom which, along with the nitrogen atoms of the azo link and quinoline moieties, can participate in the coordination of transition-metal ions,
each X independently being an optionally substituted alkyl, optionally substituted aryl, optionally substituted alkoxide, optionally substituted amine, optionally substituted amide, optionally substituted ester, sulfo or salts thereof, sulfonamide, carboxy or salts thereof, phospho or salts thereof, halide, cyano, or nitro, among others,
n is an integer value 0–5, and
at least one of $R^1$ and $R^2$ each independently being optionally substituted alkyl, optionally substituted aryl, optionally substituted —C(O)alkyl, a substituted —C(O)aryl, optionally substituted —SO$_2$alkyl, or optionally substituted —SO$_2$aryl and one of $R^1$ and $R^2$ may also be hydrogen.

2. Substituted 8-heterocylic azo-5-aminoquinoline dyes of the following formula reacted with transition-metal ions selected from the group consisting of Cr(III), Mn(II), Fe(II, III), Co(II,III), Ni(II), Cu(II), Zn(II), Pd(II), and Pt(II) in a 1:1 or 2:1 (organic:metal) by weight ratio:

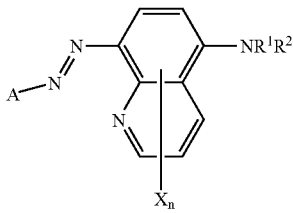

wherein:
A is 2-(4,5-dicyano-1,3-imidazolyl)-,
each X independently being an optionally substituted alkyl, optionally substituted aryl, optionally substituted alkoxide, optionally substituted amine, optionally substituted amide, optionally substituted ester, sulfo or salts thereof, sulfonamide, carboxy or salts thereof, phospho or salts thereof, halide, cyano, or nitro, among others,
n is an integer value 0–5, and
$R^1$ and $R^2$ each independently being hydrogen, optionally substituted alkyl, optionally substituted aryl, optionally substituted —C(O)alkyl, optionally substituted —C(O)aryl, optionally substituted —SO$_2$alkyl, or optionally substituted —SO$_2$aryl.

3. Substituted 8-heterocylic azo-5-aminoquinoline dyes of the following formula reacted with transition-metal ions selected from the group consisting of Cr(III), Mn(II), Fe(II, III), Co(II,III), Ni(II), Cu(II), Zn(II), Pd(II), and Pt(II) in a 1:1 or 2:1 (organic:metal) by weight ratio:

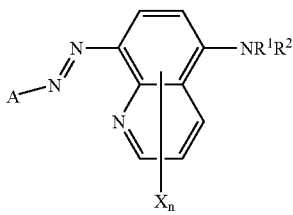

wherein:
A is 2-(4-carboxymethyl-1,3-thiazolyl)-,
each X independently being an optionally substituted alkyl, optionally substituted aryl, optionally substituted alkoxide, optionally substituted amine, optionally substituted amide, optionally substituted ester, sulfo or salts thereof, sulfonamide, carboxy or salts thereof, phospho or salts thereof, halide, cyano, or nitro, among others,
n is an integer value 0–5, and
$R^1$ and $R^2$ each independently being hydrogen, optionally substituted alkyl, optionally substituted aryl, optionally substituted —C(O)alkyl, optionally substituted —C(O)aryl, optionally substituted —SO$_2$alkyl, or optionally substituted —SO$_2$aryl.

4. The dye of claim 1 in which A is 8-quinolinyl.

5. Substituted 8-heterocylic azo-5-aminoquinoline dyes of the following formula reacted with transition-metal ions selected from the group consisting of Cr(III), Mn(II), Fe(II, III), Co(II,III), Ni(II), Cu(II), Zn(II), Pd(II), and Pt(II) in a 1:1 or 2:1 (organic:metal) by weight ratio:

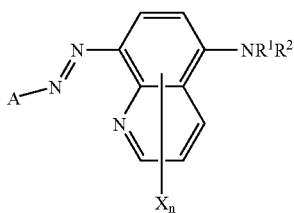

wherein:
A represents an aromatic mono or bi-heterocyclic radical containing at least one nitrogen atom which, along with the nitrogen atoms of the azo link and quinoline moieties, can participate in the coordination of transition-metal ions,
each X independently being an optionally substituted alkyl, optionally substituted aryl, optionally substituted alkoxide, optionally substituted amine, optionally substituted amide, optionally substituted ester, sulfo or salts thereof, sulfonamide, carboxy or salts thereof, phospho or salts thereof, halide, cyano, or nitro, among others,
n is an integer value 0–5, and
$R^1$ is hydrogen and $R^2$ is sulfomethyl.

6. The dye of claim 1 in which $R^1$ is hydrogen and $R^2$ is 2-carboxyethyl.

7. The dye of claim 2 in which $R^1$ is hydrogen and $R^2$ is 2-carboxyethyl.

8. The dye of claim 3 in which $R^1$ is hydrogen and $R^2$ is 2-carboxyethyl.

9. The dye of claim 4 in which $R^1$ is hydrogen and $R^2$ is 2-carboxyethyl.

10. Substituted 8-heterocylic azo-5-aminoquinoline dyes of the following formula reacted with transition-metal ions selected from the group consisting of Cr(III), Mn(II), Fe(II, III), Co(II,III), Ni(II), Cu(II), Zn(II), Pd(II), and Pt(II) in a 1:1 or 2:1 (organic:metal) by weight ratio:

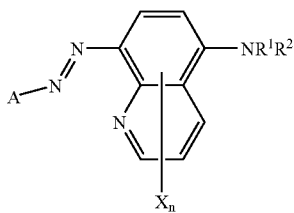

wherein:
A is 3-(5-carboxy-1,2,4-triazolyl)-,
each X independently being an optionally substituted alkyl, optionally substituted aryl, optionally substituted alkoxide, optionally substituted amine, optionally substituted amide, optionally substituted ester, sulfo or salts thereof, sulfonamide, carboxy or salts thereof, phospho or salts thereof, halide, cyano, or nitro, among others,
n is an integer value 0–5, and
$R^1$ is hydrogen and $R^2$ is 2-carboxyethyl or sulfomethyl.

11. The dye of claim 1 in which $R^1$ is hydrogen and $R^2$ is sulfomethyl.

12. The dye of claim 2 in which $R^1$ is hydrogen and $R^2$ is sulfomethyl.

13. The dye of claim 3 in which $R^1$ is hydrogen and $R^2$ is sulfomethyl.

14. The dye of claim 4 in which $R^1$ is hydrogen and $R^2$ is sulfomethyl.

15. The dye as in claim 1 in which the said transition-metal ion selected is Cu(II).

16. The dye as in claim 2 in which the said transition-metal ion selected is Cu(II).

17. The dye as in claim 3 in which the said transition-metal ion selected is Cu(II).

18. The dye as in claim 4 in which the said transition-metal ion selected is Cu(II).

19. The dye as in claim 10 in which the said transition-metal ion selected is Cu(II).

20. The dye as in claim 7 in which the said transition-metal ion selected is Cu(II).

21. The dye as in claim 8 in which the said transition-metal ion selected is Cu(II).

22. The dye as in claim 9 in which the said transition-metal ion selected is Cu(II).

23. The dye as in claim 5 in which the said transition-metal ion selected is Cu(II).

24. The dye as in claim 12 in which the said transition-metal ion selected is Cu(II).

25. The dye as in claim 13 in which the said transition-metal ion selected is Cu(II).

26. The dye as in claim 14 in which the said transition-metal ion selected is Cu(II).

27. The dye as in claim 1 in which the said transition-metal ion selected is Ni(II).

28. The dye as in claim 2 in which the said transition-metal ion selected is Ni(II).

29. The dye as in claim 3 in which the said transition-metal ion selected is Ni(II).

30. The dye as in claim 4 in which the said transition-metal ion selected is Ni(II).

31. The dye as in claim 10 in which the said transition-metal ion selected is Ni(II).

32. The dye as in claim 7 in which the said transition-metal ion selected is Ni(II).

33. The dye as in claim 8 in which the said transition-metal ion selected is Ni(II).

34. The dye as in claim 9 in which the said transition-metal ion selected is Ni(II).

35. The dye as in claim 5 in which the said transition-metal ion selected is Ni(II).

36. The dye as in claim 12 in which the said transition-metal ion selected is Ni(II).

37. The dye as in claim 13 in which the said transition-metal ion selected is Ni(II).

38. The dye as in claim 14 in which the said transition-metal ion selected is Ni(II).

* * * * *